US011623993B2

(12) United States Patent
Jürgens et al.

(10) Patent No.: US 11,623,993 B2
(45) Date of Patent: Apr. 11, 2023

(54) LAMINATE PIGMENT WITH SPACING PROPERTIES AND HIGH UV-GREYING STABILITY

(71) Applicant: Kronos International, Inc., Leverkuesen (DE)

(72) Inventors: Volker Jürgens, Kirchhundem (DE); Volker Schmitt, Leichlingen (DE)

(73) Assignee: Kronos International, Inc., Leverkusen (DE)

( * ) Notice: Subject to any disclaimer, the term of this patent is extended or adjusted under 35 U.S.C. 154(b) by 188 days.

(21) Appl. No.: 16/575,664

(22) Filed: Sep. 19, 2019

(65) Prior Publication Data

US 2020/0095427 A1 Mar. 26, 2020

(30) Foreign Application Priority Data

Sep. 21, 2018 (EP) ..................................... 18195980

(51) Int. Cl.
*C09C 1/36* (2006.01)
*D21H 21/28* (2006.01)

(52) U.S. Cl.
CPC ........... *C09C 1/3661* (2013.01); *D21H 21/28* (2013.01)

(58) Field of Classification Search
CPC . C01P 2006/62; C09C 1/3607; C09C 1/3661; D21H 17/675; D21H 17/68; D21H 17/73; D21H 19/385; D21H 19/40; D21H 21/28; D21H 27/00; D21H 27/18; D21H 27/20; D21H 27/26
See application file for complete search history.

(56) References Cited

U.S. PATENT DOCUMENTS

| | | | |
|---|---|---|---|
| 3,510,335 A | 5/1970 | McGinnis | |
| 5,114,486 A | 5/1992 | Demosthenous et al. | |
| 5,785,748 A | 7/1998 | Banford et al. | |
| 7,682,441 B2 * | 3/2010 | Drews-Nicolai | ........ C09D 7/48 106/400 |

FOREIGN PATENT DOCUMENTS

| | | |
|---|---|---|
| CN | 1036784 A | 11/1989 |
| CN | 1217736 A | 5/1999 |
| CN | 1969019 A | 5/2007 |
| CN | 101360793 A | 2/2009 |
| CN | 101553539 A | 10/2009 |
| CN | 102046732 A | 5/2011 |
| CN | 102216398 A | 10/2011 |
| CN | 103476877 A | 12/2013 |
| CN | 103717535 A | 4/2014 |
| CN | 104066890 A | 9/2014 |
| CN | 106459611 A | 2/2017 |
| DE | 102006045244 | 5/2007 |
| EP | 2724984 | 4/2014 |
| WO | 2004061013 | 7/2004 |
| WO | 2013/109436 | 7/2013 |
| WO | 2014/083242 | 6/2014 |

OTHER PUBLICATIONS

Chinese Search Report for Chinese Application 219800617977, dated Mar. 16, 2022, 1 page.

* cited by examiner

*Primary Examiner* — Shuangyi Abu Ali
(74) *Attorney, Agent, or Firm* — Locke Lord LLP; Mark R. Backofen

(57) ABSTRACT

The invention relates to a titanium dioxide particle with high opacity and UV-greying resistance comprising two silica coats and at least one alumina coat, to a method for the obtaining the same, and to the use of said particle in a method for obtaining a decorative paper laminate or a décor foil. The present invention further pertains a decorative paper laminate or a décor foil containing said coated titanium dioxide particle.

32 Claims, No Drawings

LAMINATE PIGMENT WITH SPACING PROPERTIES AND HIGH UV-GREYING STABILITY

RELATED APPLICATION

This application claims the benefit of European Patent Application No. 18195980.0 filed on Sep. 21, 2018.

BACKGROUND

Field of the Invention

The invention relates to a titanium dioxide particle with high opacity and UV-greying resistance comprising two silica coats and at least one alumina coat, to a method for the obtaining of the same, and to the use of said pigment in a method for obtaining a decorative paper laminate or a décor foil. The present invention further pertains to a decorative paper laminate or a décor foil containing said coated titanium dioxide particle.

Technological Background of the Invention

In paper laminate applications, white or light colored papers are required to have high opacity and good UV-greying resistance. Décor papers and décor foils are widely used in the production of decorative surfaces, and are commonly comprised of a stack of papers which are impregnated with a melamine resin and cured under heat and pressure. The laminates do not serve merely as facing paper to cover unattractive wood material surfaces but in addition as a carrier for functional papers. Papers are generally manufactured on a paper machine by blending a pulp suspension with a white pigment or suspension thereof together with various additives. As white pigment, titanium dioxide is commonly used in high-end laminates. The titanium dioxide pigment imparts a white color to the laminate, and provides the opacity necessary to hide the afore-mentioned unattractive wood substrate. The completed paper laminate thus contains the titanium dioxide pigment as well as small amounts of entrapped moisture and oxygen. When exposed to UV-radiation, it is known that titanium dioxide has photocatalytic properties. Incorporated in a laminate and exposed to UV-radiation in presence of water and oxygen, said laminate can turn grey to a variable degree, which is undesirable.

Titanium dioxide pigments used for décor papers with a low tendency to UV-greying are well-established and characterized in that aluminum phosphate and an alkaline nitrate are used to suppress UV-greying. For example, U.S. Pat. No. 5,114,486 discloses coating with zinc/aluminum phosphate in order to improve UV-greying resistance. Document U.S. Pat. No. 5,785,748 describes a method for obtaining an uniform coat on titanium dioxide with aluminum phosphate wherein a mixture of concentrated phosphoric acid, and an aluminum compound is added to a titanium dioxide containing suspension, and aluminum phosphate is subsequently precipitated at a pH value of 3.5 or more. The application WO 2004/061013 A2 discloses a titanium dioxide pigment with good UV-greying resistance for the use in decorative paper laminate that is provided with an aluminum phosphate coat and demonstrates particularly favorable surface properties as regards the isoelectric point and the zeta potential. The aluminum phosphate layer is precipitated at a constantly maintained pH value of 7. In an advanced development of the latter method according to DE 10 2006 045 244 A1, the coated pigment is finally subjected to heat treatment. However, the vast majority of these pigments show a mediocre opacity performance compared to pigment for paint applications.

In contrast to pigments for paper laminate, those for paint applications have other targeted properties such as high opacity. U.S. Pat. No. 3,510,335 describes titanium dioxide pigments with a special type of post-treatment being particularly suitable for the production of matt emulsion paints. The pigment particles are coated with a high amount of silicon dioxide and alumina to a relatively high level of at least 5 wt. % referred to the total weight of the pigment. The coating is applied by a precipitation method aimed at achieving the particularly voluminous, porous, and "fluffy" surface coating. However, the UV-greying resistance is not satisfying for laminate applications, in particular not for high-end laminate applications.

Hence, there is a need in the art to provide a coated titanium dioxide particle with both excellent UV-greying resistance and good opacity at the same level of pigmentation, which makes said particle in particular suitable for laminate applications.

OBJECTS AND BRIEF DESCRIPTION OF THE INVENTION

It is the object of the present invention to provide a coated titanium dioxide particle with excellent UV-greying resistance and good opacity at the same level of pigmentation.

The object is achieved by a coated titanium dioxide particle obtained by a method comprising the steps of (i) providing an aqueous suspension of an uncoated titanium dioxide particle; (ii) adding phosphoric acid to said suspension in order to adjust the pH of the suspension to a value of 2 or less; (iii) adding an alkaline silicon dioxide precursor to said suspension such that after the addition the suspension has a pH value of from 7 to 8 in order to form a first silica coat onto said particle; (iv) adding an acid to said suspension in order to adjust the pH of the suspension to a value of from 2 to 3; (v) adding an alkaline silicon dioxide precursor to said suspension such that after the addition the suspension has a pH value of from 4 to 5 in order to form a second silica coat onto the first silica coat; and (vi) applying at least one aluminum oxide coat onto the second silica coat.

The titanium dioxide particle obtained by the method according to the invention shows both good opacity at the same level of pigmentation compared to known particles used in laminate systems, but superior UV-greying resistance compared to common particles. In addition, without wishing to be bound to any specific scientific theory, it is considered that the combination of method conditions, in particular the narrow pH ranges in steps (ii), (iii), and (v) as well as the use of phosphoric acid in step (ii) provide for good opacity, and UV-greying resistance.

Therefore, in a first aspect, the invention relates to a method for obtaining a coated titanium dioxide particle, comprising the steps of (i) providing an aqueous suspension of an uncoated titanium dioxide particle; (ii) adding phosphoric acid to said suspension in order to adjust the pH of the suspension to a value of 2 or less; (iii) adding an alkaline silicon dioxide precursor to said suspension such that after the addition the suspension has a pH value of from 7 to 8 in order to form a first silica coat onto said particle; (iv) adding an acid to said suspension in order to adjust the pH of the suspension to a value of from 2 to 3; (v) adding an alkaline silicon dioxide precursor to said suspension such that after the addition the suspension has a pH value of from 4 to 5 in order to form a second silica coat onto the first silica coat; and (vi) applying at least one aluminum oxide coat onto the second silica coat.

In a further aspect, the invention relates to a coated titanium dioxide particle obtained by the method disclosed herein.

In another aspect, the invention pertains the use of the coated titanium dioxide particle according to the present invention in the method for obtaining a decorative paper laminate or a décor foil.

In a final aspect, the invention refers to a decorative paper laminate or a décor foil containing a coated titanium dioxide particle of the present invention.

DESCRIPTION OF THE INVENTION

These and further aspects, features, and advantages of the invention become apparent to the skilled person from a study of the following detailed description and claims. Each feature from one aspect of the invention may also be used in any other aspect of the invention. Further, of course, the examples contained herein are intended to describe and illustrate the invention, but not to limit it, and, in particular, the invention is not limited to such examples. Numerical ranges stated in the form "from x to y" include the values mentioned and those values that lie within the range of the respective measurement accuracy as known to the skilled person. If several preferred numerical ranges are stated in this form, of course, all the ranges formed by a combination of the different end points are also included. The use of the term "about" is intended to encompass all values that lie within the range of the respective measurement accuracy known to the skilled person.

All percentages stated in connection with the compositions herein described relate to percent by weight (wt.-%) unless explicitly stated otherwise, respectively based on the mixture of composition in question. The term "substantially free" is intended to connote that the particular material is not detected (i.e. is below the detection limit) using standard commercial tests and methodologies used in the industry as of the earliest priority date of this application or otherwise is only detected in trace amounts such as might be caused by contaminants in the particular grade of materials used or arising from the manufacturing process. Unless otherwise stated, standard commercial grades of materials are used and it is preferred that the various materials are substantially free of other compounds.

"At least one" as used herein relates to one or more, i.e. 1, 2, 3, 4, 5, 6, 7, 8, 9 or more. With respect to a coat, the value relates to the coat and not to the absolute number of molecules in the coat.

The titanium dioxide particle to be coated by the method of the present invention is preferably a pigment based on titanium dioxide. "Pigment", as used herein, relates to inorganic colorants that are virtually insoluble in the application medium according to DIN 55 943 which are neither chemically nor physically changed in the application medium and retain their particulate structure. They are employed for coloring, which is based on the interaction of the pigment particles with the visible light by absorption and remission.

The method disclosed herein aims the coating of titanium dioxide particles. The titanium dioxide as disclosed herein may have been obtained by the sulfate process or by the chloride process. Titanium dioxide may be present in the crystal structures of rutile, anatase or brookite, usually in the crystal structures of rutile or anatase. Rutile is particularly suitable as compared to anatase because of its lower photolytic catalytic activity. Preferably, the titanium dioxide particle used consists of at least 98 wt. %, preferably of at least 99 wt. % rutile referred to the total weight of said particle.

Within the scope of the invention, the titanium dioxide particles have a size, preferably a primary particle size, such as to scatter the visible light, ideally to a high rate. The particle size is the mass-related median d50 (hereinafter: d50) of from 200 to 400 nm determined by disc centrifuge. "Primary particle", as used herein, relates to a particle which may form together with at least one other particle to form agglomerates and aggregates. This definition of primary particles also covers twins and multiple twins, which are known in the art and can be analyzed by, for example, TEM analysis.

In step (i) of the method, an aqueous suspension of an uncoated titanium dioxide particle is provided. "Aqueous suspension", as used herein, refers to a suspension comprising at least 10 wt. %, preferably 20 wt. %, more preferably at least 30 wt. % water based on the total weight of the aqueous suspension. The titanium dioxide particle is contained in concentrations well known in the art ranging from 150 g/L to 500 g/L, preferably 400 g/L.

In general, the method disclosed herein can be conducted in known devices suitable for these reactions. Further, the suspensions can be stirred, in particular during addition of another compound such as precursor, and brought to a specific temperature known in the art in order to provide suitable conditions for the following reactions and method steps. After each step, the thus obtained suspension can be aged for 5 to 60 minutes.

In the subsequent step (ii), phosphoric acid is added to the suspension in order to adjust the pH of the suspension to a value of 2 or less. The phosphoric acid is added in an amount of 1 to 4 wt. %, preferably 2 to 3 wt. %, and more preferably 2.5 wt. % calculated as $P_2O_5$ referred to the total weight of the uncoated titanium dioxide particle. The phosphoric acid can be added over a course of 5 to 30 minutes, and preferably of 15 minutes. Preferably phosphoric acid is the only acid added during step (ii). In case the pH value is further lowered to below 1, in addition to the used phosphoric acid, another acid can be used selected from the group consisting of sulfuric acid, nitric acid, titanyl chloride, titanyl sulfate, hydrochloric acid, and a combination thereof.

In step (iii), an alkaline silicon dioxide precursor is added to the suspension such that after the addition of said precursor the suspension has a pH value of from 7 to 8. By doing so, a first silica coat is applied onto the uncoated titanium dioxide particle. The addition is preferably conducted under agitation and can be conducted at elevated temperature. The precursor can be added to the suspension over a course of 5 to 60 minutes, and preferably over the course of 30 minutes. Preferably, during step (iii) the suspension is substantially free of any coating precursor other than alkaline silicon dioxide precursor that can precipitate onto the titanium dioxide particles under the conditions in step (iii).

Then, in step (iv), an acid is added to the suspension obtained after step (iii) in order to adjust the pH of the suspension to a value of from 2 to 3. Suitable acids include, without limitation, sulfuric acid, nitric acid, phosphoric acid, hydrochloric acid, titanium oxychloride, titanyl sulfate, or a combination thereof. Preferably, sulfuric acid or titanium oxychloride are used. Titanium oxychloride improves the UV-greying resistance of the obtained and used titanium dioxide particles, and is therefore particularly preferred. The acid can be added to the suspension over a course of 5 to 30 minutes, and preferably of 10 minutes.

Then, in step (v), an alkaline silicon dioxide precursor is added to the suspension such that after the addition the suspension has a pH value of from 4 to 5 in order to form a second silica coat onto the first silica coat. As a result, a second silica coat is applied onto the first silica coat. Preferably, this second silica coat is applied directly onto the first silica coat. The addition is preferably conducted under agitation, and can be conducted at elevated temperature. The precursor can be added to the suspension over a course of 5 to 60 minutes, and preferably over the course of 30 minutes. Preferably, during step (v) the suspension is substantially free of any coating precursor other than the alkaline silicon dioxide precursor that can precipitate onto the titanium dioxide particles under the conditions in step (v).

The alkaline silicon dioxide precursor in both step (iii) and (v) is independently from each other selected from the group consisting of sodium silicate, potassium silicate, and lithium silicate. Preferably, both alkaline silicon dioxide precursors are the same and more preferably sodium silicate is used for each precursor.

In step (vi), at least one aluminum oxide coat is applied onto the second silica coat. Preferably this aluminum oxide coat is applied directly to the second silica coat. Any suitable aluminum oxide precursor can be used for the application of said aluminum oxide coat. In a preferred embodiment, an acidic aluminum precursor is added to the suspension in order to form said coat onto the second silica coat. The acidic aluminum oxide precursor is preferably selected from the group consisting of aluminum sulfate, aluminum nitrate, and aluminum chloride, and said precursor is preferably aluminum sulfate. Preferably, steps (i)-(vi) are conducted without any additional steps between them.

Without wishing to be bound to a specific theory, it is believed that the good opacity at the same level of pigmentation compared to known particles used in laminate systems, but superior UV-greying resistance are attributable to the specific production method described herein, particularly the features of the pH ranges in steps (ii), (iii) to (v) as well as the use of phosphoric acid in step (ii).

Preferably, in each step (iii) and (v), the silicon dioxide precursor is added in an amount such as each of the obtained silicon dioxide coats are independently from each other of from 0.6 to 8 wt. %, preferably of from 1.6 to 6.5 wt. %, and more preferably of from 2.6 to 5 wt. % referred to the total weight of the coated particle. Preferably, in addition or alternatively to the afore-mentioned silicon dioxide coats, in each step (vi) and (vii), the aluminum oxide precursor is added in an amount such as each of the obtained aluminum oxide coats is independently from each other of from 0.8 to 4.2 wt. %, preferably of from 1.3 to 3.7 wt. %, and more preferably of from 1.8 to 3.2 wt. % referred to the total weight of the coated particle.

In addition to the coats described above, further coats can be applied. After step (vi), an alkaline aluminum oxide precursor is preferably added to said suspension in step (vii) in order to form a second aluminum oxide coat onto the first alumina coat. Preferably the second aluminum oxide coat is applied directly to the first aluminum oxide coat. Any suitable aluminum oxide precursor can be used for the application of said aluminum oxide coat. Preferably, the alkaline aluminum oxide precursor is selected from the group consisting of sodium aluminate and aluminum acetate. More preferably, the precursor is sodium aluminate.

In an even more preferred embodiment, in step (iii), the silicon dioxide precursor is added in an amount such as the obtained silicon dioxide coat is of from 2 to 8 wt. %, preferably of from 3.5 to 6.5 wt. %, and more preferably of from 5 wt. %, and in step (v), the silicon dioxide precursor is added in an amount such as the obtained silicon dioxide coat is of from 0.6 to 4.6 wt. %, preferably of from 1.6 to 3.6 wt. %, and more preferably 2.6 wt. %. Moreover, in step (vi), the aluminum oxide precursor is added in an amount such as the obtained aluminum oxide coat is of from 0.8 to 2.8 wt. %, preferably of from 1.3 to 2.3 wt. %, and more preferably 1.8 wt. % and in step (vii), the aluminum oxide precursor is added in an amount such as the obtained aluminum oxide coat is of from 2.2 to 4.2 wt. %, preferably of from 2.7 to 3.7 wt. %, and more preferably 3.2 wt. % referred to the total weight of the coated particle. All weight percentages indicated in this even more preferred embodiment refer to the total weight of the coated particle.

In a preferred embodiment, the pH value after the addition of the acidic aluminum oxide precursor used in step (vi) of the thus obtained suspension is of from 1 to 5, more preferably from 2 to 4, and even more preferably 3. Alternatively or in addition, in another preferred embodiment, the pH value after the addition of the alkaline aluminum oxide precursor in step (vii) of the thus obtained suspension is of from 5 to 9, preferably 6 to 8, and more preferably 7.

Further method steps known in the art can be conducted. These include, for example, separating the coated titanium dioxide particle from the suspension, washing, sand or bead milling, steam milling, drying, using additives, or combinations of such steps. This serves for the improvement of the physical, especially optical, and chemical properties of the particle pigment.

To further improve the UV-greying resistance, alkaline metal nitrates can be added to the titanium dioxide particle during drying and/or milling. The alkaline metal nitrate can be selected from group of potassium nitrate and sodium nitrate. Techniques and the amount of the nitrate to be added, to improve said resistance are known in the art.

In a further aspect, the invention is directed to a coated titanium dioxide particle obtained by a method of the present invention. In a preferred embodiment, the coated titanium dioxide particle is a titanium dioxide particle, which comprises onto its surface 5 wt. % of a first silicon dioxide coat, on said first silicon dioxide coat 2.6 wt. % of a second silicon dioxide coat, on said second silicon dioxide coat 1.8 wt. % of a first alumina coat, and on said first alumina coat a second alumina coat of 3.2 wt. % referred to the total weight of the titanium dioxide particle.

In a yet further aspect, the present invention pertains the use of the coated titanium dioxide particle in the method for obtaining a decorative paper laminate or a décor foil. The coated particle is used in order to whiten the decorative paper laminate or a décor foil it is incorporated in. Moreover, said particle can be used to improve the UV-greying resistance of the decorative paper laminate or a décor foil it is incorporated in.

In a final aspect, the present invention is directed to a decorative paper laminate or a décor foil comprising a coated titanium dioxide particle of the present invention.

All references cited herein are incorporated by reference in their entirety.

EXAMPLES

Example 1

A titanium dioxide pigment suspension was provided by mixing 15 kg titanium dioxide with 43 L water. Phosphoric acid was subsequently added to the uncoated particle under agitation over a course of 15 minutes to obtain a suspension with a pH value of 2. Then, an aqueous solution of sodium silicate was added under agitation in an amount such that the obtained silicon dioxide coat is 5 wt. % calculated as $SiO_2$ referred to the final coated particle.

During the addition of sodium silicate, the pH value was monitored. The addition was stopped at a pH in the range of from 7 to 8. In this range, the suspension was highly viscous. After the deposition of the first coat and while the suspension was stirred, sulfuric acid was added in an amount such as the pH was lowered to the range of from 2 to 3. Then, 2.6 wt. % sodium silicate calculated as $SiO_2$ were added over a course of 30 minutes until the pH reached a value of 4 to 5. 1.8 wt. % aluminum sulfate was subsequently added over a course of 30 minutes and, finally, 3.2 wt. % sodium aluminate was added over a course of 40 minutes. The thus obtained coated particle was filtered, washed, dried, and milled. During the drying step, an aqueous solution of sodium nitrate was added so that the obtained particle comprised 0.18 wt. % nitrate referred to the titanium dioxide.

Example 2

The same method was conducted as the one of Example 1 except that titanium oxychloride instead of sulfuric acid was used to lower the pH in step (iv).

Comparative Example 1

The same method was conducted as the one of Example 1 except, that sulfuric acid instead of phosphoric acid was used to lower the pH to a range of less than 2 in step (ii).

Comparative Example 2

The same method was conducted as the one of Comparative Example 1 except, that each silicon dioxide coat applied was 5.5 wt. % with respect to the total weight of the coated titanium dioxide particle.
Test Methods and Test Results
Particle Size Determination The size of the titanium dioxide particles were determined by using a CPS Disc centrifuge, Model DC 20000 available from CPS Instrument, Inc. located in Florida, United States of America. The sample was prepared by obtaining a first premix by mixing 2 g of a dry pigment particles with 80 g sodium hexametaphosphate (0.06 mass % in water) commercially available from BK Giulini GmbH in Ladenburg, Germany, under the name Calgon N until the first premix was homogenized. Subsequently, 2 g of this first premix were added to 48 g Calgon N, and again sufficiently homogenized by mixing to obtain a second premix. 100 μL of this second premix were used as the sample for determining the particle size. The centrifuge was operated at 3,000 rpm. The calibration standard parameters were as follows:
Particle density: 1.385 g/mL
Peak diameter: 1.27 μL
Half height peak width: 0.08 μL
The fluid parameters were as follows:
Fluid density: 1.045 g/mL
Fluid refraction index: 1.344
Fluid viscosity: 1.2 cps
Preparation of Paper Laminates (Laboratory Scale)

The titanium dioxide pigments obtained in accordance with Example 1 and 2 and the Comparative Example 1 and 2 were incorporated into decorative paper laminate and subsequently tested as regards their optical properties and UV-greying resistance. For this, the titanium dioxide pigment to be tested was incorporated into pulp, and sheets with a sheet weight of roughly 80 $g/m^2$ and a titanium dioxide content by mass of roughly 30 $g/m^2$ were produced. The décor papers were then impregnated with an aqueous melamine resin and pressed under temperature to a paper laminate.

For assessing the optical properties of the decorative paper laminates, and thus the quality of the titanium dioxide pigment, it is important to compare decorative paper laminates with equal ash contents. This makes it necessary to adapt the quantity of titanium dioxide pigment used for forming the sheet to be adapted, in accordance with the retention, to the required titanium dioxide content to amass in the paper, 30±1 $g/m^2$ in this case, or the required grammage, 80±1 $g/m^2$ in this case. In these tests, 1.65 g oven-dry pulp was taken as the basis for the formation of a sheet. The procedure and the auxiliaries used are familiar to the person skilled in the art.

The titanium dioxide content (ash in [%]) of a sheet was subsequently determined. The titanium dioxide content was determined by incinerating a defined weight of the produced paper in a rapid incinerator at 800° C. The titanium dioxide content by mass (ash in [%]) can be calculated by weighing the residue. The following formula was used as the basis for calculating the ash content:

Ash content $[g/m^2]$=(Ash [%]×Grammage $[g/m^2]$)/ 100[%].

The further processing of the paper encompassed its impregnation and pressing into laminates. The sheet to be impregnated with resin was completely saturated with melamine resin solution, then drawn between 2 doctor blades to ensure application of a specific amount of resin and subsequently pre-condensed at 130° C. in a recirculating-air drying oven. The amount of resin applied was 110 to 140 wt. % of the sheet. The sheet had a residual moisture content of 5.7 to 6.2 wt. %. The condensed sheets were combined into stacks with phenolic resin-impregnated core papers and white or black underlay paper.

The stacks for measuring the optical properties had the following structure: decorative paper laminate, white or black underlay paper, 6 sheets of core paper, white or black underlay paper, decorative paper laminate.

The stacks for determining the UV-greying resistance had the following structure: decorative paper laminate, 5 sheets of core paper, white underlay paper.

The stacks were pressed for 300 seconds with the help of a Wickert Type 2742 laminating press at a temperature of 140° C. and a pressure of 90 bar.
Testing The optical properties and the UV-greying resistance of the laminates were determined using commercially available equipment (spectrophotometer, Xenotest weathering machine). To assess the optical properties of laminates, the optical values (CIELAB L*, a*, b*) to DIN 6174 are measured with the help of the ELREPHO® 3300 colorimeter over white and black underlay paper. The CIELAB optical value L* over white underlay paper ($L^*_{white}$) was used as a measure of the brightness. The opacity is a measure of the light transmission of the paper.

The following parameters were selected as a measure of the opacity of the laminates: CIELAB L*black, the brightness of the laminates measured over black underlay paper. The, CIELAB L*black is standardised to an ash content of 30.0 g/m². To assess the UV-greying resistance (light-fastness) of the titanium dioxide pigments the corresponding laminate samples are exposed in a XENOTEST® Alpha machine. The optical values CIELAB L*, a* and b* to DIN 6174 were measured before and after an exposure period in the XENOTEST® Alpha of 96 hours. The light source is a xenon-arc lamp with a radiation intensity of 70 W/m². The temperature in the specimen chamber of the machine is 45° C., the relative humidity being 30%. The samples are revolved during exposure. $\Delta L^* = L^*_{before} - L^*_{after}$ is stated as a measure of the UV-greying resistance.

The results of the experiments are compiled in Table 1.

TABLE 1

UV-greying resistance and opacity values of the obtained examples

| Example | UV-Greying Resistance $\Delta L^*$ | Opacity $L^*_{over\ black}$ |
|---|---|---|
| Example 1 | −0.95 | 90.50 |
| Example 2 | −0.90 | 90.60 |
| Comparative Example 1 | −2.54 | 90.60 |
| Comparative Example 2 | −2.36 | 91.00 |

As compared to the comparative examples prepared with state of the art laminate titanium dioxide pigment, the laminates prepared according to the invention (Examples 1 and 2) possess a significantly higher UV-greying resistance and opacity similar to those of the prior art.

The invention claimed is:

1. A method for obtaining coated titanium dioxide particles having a total weight, comprising the steps of:
   (i) providing an aqueous suspension of uncoated titanium dioxide particles;
   (ii) adding phosphoric acid to the aqueous suspension to adjust the pH of the aqueous suspension to a value of no more than about 2;
   (iii) adding a first alkaline silicon dioxide precursor to the aqueous suspension produced in step (ii), wherein after the addition the aqueous suspension has a pH value of from about 7 to about 8 and the silicon dioxide precursor formed a first silica coat on the particles;
   (iv) adding an acid to the aqueous suspension produced in step (iii) to adjust the pH of the aqueous suspension to a value of from about 2 to about 3;
   (v) adding a second alkaline silicon dioxide precursor to the aqueous suspension produced in step (iv), wherein after the addition the aqueous suspension has a pH value of from about 4 to about 5 and the second alkaline silicon dioxide precursor formed a second silica coat on the first silica coat; and
   (vi) applying at least one aluminum oxide coat onto the second silica coat.

2. The method of claim 1, wherein in step (vi) an acidic aluminum oxide precursor is added to the aqueous suspension produced in step (v) to form the at least one aluminum oxide coat.

3. The method of claim 2, wherein the acidic aluminum oxide precursor is selected from the group consisting of aluminum sulfate, aluminum nitrate, aluminum chloride, and combinations thereof.

4. The method of claim 3, wherein the acidic aluminum oxide precursor is aluminum sulfate.

5. The method of claim 2, wherein after the addition of at least one aluminum oxide coat the resulting aqueous suspension has a pH value of from about 1 to about 5.

6. The method of claim 5, wherein after the addition of at least one aluminum oxide coat the resulting aqueous suspension has a pH value of from about 2 to about 4.

7. The method of claim 6, wherein after the addition of at least one aluminum oxide coat the resulting aqueous suspension has a pH value of about 3.

8. The method of claim 2, further comprising the step of:
   (vii) adding an alkaline aluminum oxide precursor to the aqueous suspension produced in step (vi) in order to form a second aluminum oxide coat on a first aluminum oxide coat produced in step (vi).

9. The method of claim 8, wherein after the addition of the alkaline aluminum oxide precursor in step (vii) the resulting aqueous suspension has a pH value of from about 5 to about 9.

10. The method of claim 9 wherein after the addition of the alkaline aluminum oxide precursor in step (vii) the resulting aqueous suspension has a pH value of from about 6 to about 8.

11. The method of claim 10, wherein after the addition of the alkaline aluminum oxide precursor in step (vii) the resulting aqueous suspension has a pH value of about 7.

12. The method of claim 8, wherein the alkaline aluminum oxide precursor is selected from the group consisting of sodium aluminate, aluminum acetate, and combinations thereof.

13. The method of claim 12, wherein the alkaline aluminum oxide precursor is sodium aluminate.

14. The method of claim 8, wherein:
   in step (iii), the first silicon dioxide precursor is added in an amount such that the first silica coat is of from about 2 to about 8 wt. % referred to the total weight of the coated particle;
   in step (v), the second silicon dioxide precursor is added in an amount such as the second silica coat is of from about 0.6 to about 4.6 wt. %, referred to the total weight of the coated particle;
   in step (vi), the aluminum oxide precursor is added in an amount such that the aluminum oxide coat is of from about 0.8 to about 2.8 wt. %, referred to the total weight of the coated particle; and
   in step (vii), the aluminum oxide precursor is added in an amount such that the second aluminum oxide coat is of from about 2.2 to about 4.2 wt. %, referred to the total weight of the coated particle.

15. The method of claim 8, wherein:
   in step (iii), the first silicon dioxide precursor is added in an amount such that the first silica coat is of from about 3.5 to about 6.5 wt. % referred to the total weight of the coated particle;
   in step (v), the second silicon dioxide precursor is added in an amount such that the second silica coat is of from about 1.6 to about 3.6 wt. %, referred to the total weight of the coated particle;
   in step (vi), the aluminum oxide precursor is added in an amount such that the aluminum oxide coat is of from about 1.3 to about 2.3 wt. %, referred to the total weight of the coated particle; and
   in step (vii), the aluminum oxide precursor is added in an amount such that the second aluminum oxide coat is of from about 2.7 to about 3.7 wt. %, referred to the total weight of the coated particle.

16. The method of claim 8, wherein:
   in step (iii), the first silicon dioxide precursor is added in an amount such that the first silica coat is about 5 wt. % referred to the total weight of the coated particle;

in step (v), the second silicon dioxide precursor is added in an amount such that the second silca coat is about 2.6 wt. %, referred to the total weight of the coated particle;

in step (vi), the aluminum oxide precursor is added in an amount such that the first aluminum oxide coat is about 1.8 wt. %, referred to the total weight of the coated particle; and in step (vii), the aluminum oxide precursor is added in an amount such that the second aluminum oxide coat is about 3.27 wt. %, referred to the total weight of the coated particle.

17. The method of claim 8, wherein in each of steps (vi) and (vii), the aluminum oxide precursor is added in an amount such that the obtained aluminum oxide first and second coats are independently from about 0.8 to about 4.2 wt. % referred to the total weight of the coated particle.

18. The method of claim 8, wherein in each of steps (vi) and (vii), the aluminum oxide precursor is added in an amount such that the obtained aluminum oxide first and second coats are independently from about 1.3 to about 3.7 wt. % referred to the total weight of the coated particle.

19. The method of claim 8, wherein in each of steps (vi) and (vii), the aluminum oxide precursor is added in an amount such that the obtained aluminum oxide first and second coats are independently from about 1.8 to about 3.2 wt. % referred to the total weight of the coated particle.

20. The method of claim 1, wherein each of the first and second alkaline silicon dioxide precursors is independently selected from the group consisting of sodium silicate, potassium silicate, and lithium silicate, and combinations thereof.

21. The method of claim 20, wherein each of the first and second alkaline silicon dioxide precursors is sodium silicate.

22. The method of claim 1, wherein in step (ii) in addition to the phosphoric acid a second acid is added to the aqueous suspension selected from the group consisting of sulfuric acid, nitric acid, titanium oxychloride, titanyl sulfate, hydrochloric acid, and combinations thereof.

23. The method of claim 1, wherein in step (iv) the acid is selected from the group consisting of sulfuric acid, nitric acid, titanium oxychloride, titanyl sulfate, hydrochloric acid, phosphoric acid, and combinations thereof.

24. The method of claim 23, wherein in step (iv) the acid is titanium oxychloride.

25. The method claim 1, wherein in step (ii) phosphoric acid is added in an amount of from about 1 to about 4 wt. % calculated as $P_2O_5$ referred to the total weight of the uncoated titanium dioxide particle.

26. The method of claim 25, wherein in step (ii) phosphoric acid is added in an amount of from about 2 to about 3 wt. % calculated as $P_2O_5$ referred to the total weight of the uncoated titanium dioxide particle.

27. The method of claim 26, wherein in step (ii) phosphoric acid is added in an amount of about 2.5 wt. % calculated as $P_2O_5$ referred to the total weight of the uncoated titanium dioxide particle.

28. The method of claim 1, wherein in each of steps (iii) and (v), the silicon dioxide precursor is added in an amount such that each of the obtained first and second silica coats are independently from about 0.6 to about 8 wt. % referred to the total weight of the coated particle.

29. The method of claim 1, wherein in each of steps (iii) and (v), the silicon dioxide precursor is added in an amount such that each of the obtained first and second silica coats are independently from about 1.5 to about 6.5 wt. % referred to the total weight of the coated particle.

30. The method of claim 29, wherein in each of steps (iii) and (v), the silicon dioxide precursor is added in an amount such that each of the obtained first and second silica coats are independently from about 2.6 to about 5 wt. % referred to the total weight of the coated particle.

31. The method of claim 1 further comprising the steps of:
separating the coated particles from the aqueous suspension after step (vi);
washing, drying, and milling the coated particles; and
adding an additive to the coated particles.

32. The method of claim 31 wherein the additive is an alkaline metal nitrate selected from the group consisting of potassium nitrate, sodium nitrate and combinations thereof.

* * * * *